(12) United States Patent
Vilrokx et al.

(10) Patent No.: US 9,847,101 B2
(45) Date of Patent: Dec. 19, 2017

(54) VIDEO STORYTELLING BASED ON CONDITIONS DETERMINED FROM A BUSINESS OBJECT

(71) Applicant: ORACLE INTERNATIONAL CORPORATION, Redwood Shores, CA (US)

(72) Inventors: Mark Vilrokx, San Mateo, CA (US); Thao Bich Nguyen, San Francisco, CA (US); John Cartan, Alameda, CA (US); Tanuj Shah, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 51 days.

(21) Appl. No.: 14/577,894

(22) Filed: Dec. 19, 2014

(65) Prior Publication Data
US 2016/0180881 A1 Jun. 23, 2016

(51) Int. Cl.
G11B 27/031 (2006.01)
G11B 27/34 (2006.01)
G11B 27/10 (2006.01)

(52) U.S. Cl.
CPC .......... *G11B 27/031* (2013.01); *G11B 27/102* (2013.01); *G11B 27/34* (2013.01)

(58) Field of Classification Search
CPC ...... G11B 27/031; G11B 27/102; G11B 27/34
USPC .................................................. 386/239–241
See application file for complete search history.

(56) References Cited

U.S. PATENT DOCUMENTS

| | | | | |
|---|---|---|---|---|
| 7,542,969 | B1 * | 6/2009 | Rappaport | G06F 17/30672 |
| 8,078,642 | B1 * | 12/2011 | Poutanen | G06F 17/30864 |
| | | | | 707/706 |
| 8,737,770 | B2 * | 5/2014 | Toebes | G10L 15/26 |
| | | | | 382/305 |
| 2005/0232574 | A1 * | 10/2005 | Kawai | H04N 7/18 |
| | | | | 386/337 |
| 2008/0097970 | A1 * | 4/2008 | Olstad | G06F 17/30796 |

(Continued)

OTHER PUBLICATIONS

"Flipboard for iPhone review", Dec. 2011, 9 pages, url: http://www.appsafari.com/news/17786/flipboard-for-iphone/.

(Continued)

*Primary Examiner* — Gelek W Topgyal
(74) *Attorney, Agent, or Firm* — Vista IP Law Group, LLP

(57) ABSTRACT

A method, system, and computer program product for data presentation using video. Embodiments commence upon invoking a computer-implemented task to receive a user credential, which credential is used to determine and access one or more initial search corpora. Information in the initial search corpora are analyzed to determine at least one attribute pertaining to the information. The attribute, such as a performance metric or attribute, is used to evaluate various scene conditions comprising one or another forms of decision criteria based on the attribute or performance metric. A scene condition is then used to determine the content of a particular next scene, wherein the content can comprise new information, which in turn is used in evaluation of another scene condition to determine yet another next scene. The process continues iteratively or recursively wherein determining the next scene is based at least in part on the scene condition of another scene.

20 Claims, 9 Drawing Sheets

(56) References Cited

U.S. PATENT DOCUMENTS

| | | | | |
|---|---|---|---|---|
| 2008/0154889 | A1* | 6/2008 | Pfeiffer | G06F 17/3084 |
| 2009/0274364 | A1* | 11/2009 | Shakya | G06K 9/00362 |
| | | | | 382/165 |
| 2010/0070523 | A1* | 3/2010 | Delgo | G06F 17/3079 |
| | | | | 707/769 |
| 2010/0121839 | A1* | 5/2010 | Meyer | G06F 17/30893 |
| | | | | 707/720 |
| 2011/0047163 | A1* | 2/2011 | Chechik | G06F 17/30781 |
| | | | | 707/741 |
| 2013/0275412 | A1* | 10/2013 | Kaushal | G06F 17/30023 |
| | | | | 707/722 |
| 2015/0220638 | A1* | 8/2015 | Motoyama | G06F 17/30864 |
| | | | | 707/722 |
| 2016/0027470 | A1* | 1/2016 | Newman | H04N 5/77 |
| | | | | 386/241 |
| 2016/0041998 | A1* | 2/2016 | Hall | G06F 17/30106 |
| | | | | 707/725 |

OTHER PUBLICATIONS

Kathy Miedema, "Oracle Fusion Applications CRM Helps Drive Sales with Sharp, Practical User Experience" Oralce, Usable Apps, Application User Experience, First Published: Dec. 30, 2011, Revised: Jun. 22, 2012, 3 pages.

Adam Ostrow, "13 Must-See Google Maps Mashups", Mashable, Jul. 10, 2007, 12 pages, url: http://mashable.com/2007/07/10/google-maps-mashups-2/.

\* cited by examiner

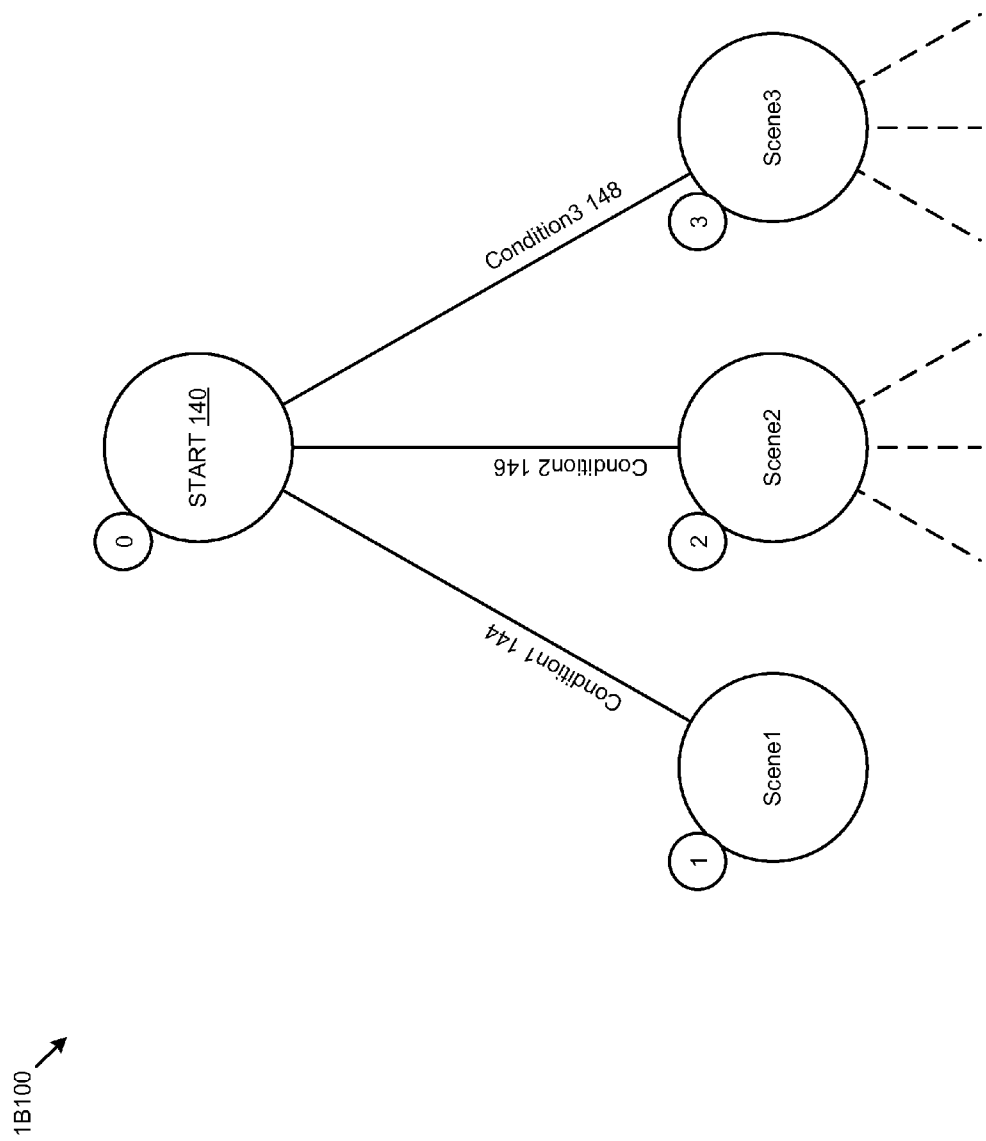
FIG. 1B1

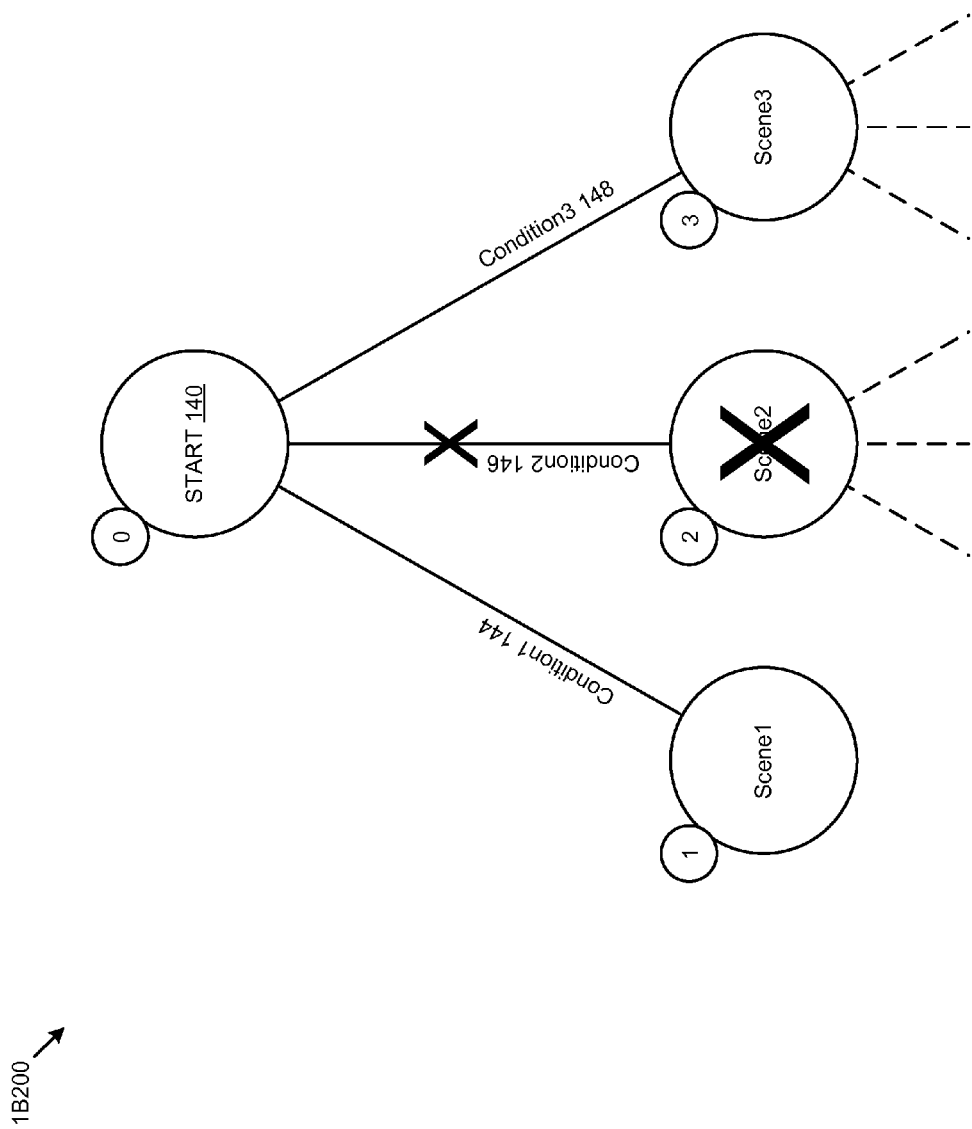
FIG. 1B2

VIDEO STORYTELLING BASED ON CONDITIONS DETERMINED FROM A BUSINESS OBJECT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This disclosure relates to the field of data presentation using video and more particularly to techniques for generating multi-scene video clips based on a conditional logic graph.

BACKGROUND

Consumers of information rely more and more on video as a primary means of ingesting information. Some attempts at automatically generating video from text produce a series of images that correspond more-or-less to a series of paragraphs. In some cases, the series of images produced includes a voiceover generated using an automatic text-to-speech processor. For example, some early attempts take the form of a series of images stitched together into a video stream, which each image being displayed for a duration of roughly the same amount of time elapsed while the text-to-speech processor is uttering the text on the page. This technique can be used by certain physically-impaired people in order to make information more accessible. However, such a technique is deficient at least in that the relevance of the information to the consumer of the information presented is limited to the nature of the click or selection. For example, even though such a legacy technique can be used to render a Wikipedia article, the interaction with the media is limited to merely identifying the Wikipedia article. The video generated using this legacy technique merely narrates the Wikipedia article.

Another legacy technique attempts to relate information to the information consumer by automatically selecting information to present in video form based on the user's identity. For example, based on a user's identity or account number, that user's account information (e.g., the current month's phone bill) can be presented as a series of images, where each image is a rendering of a particular portion of the phone bill. This legacy technique is still deficient at least in that it fails to process conditions to determine under what situations one set or another set of scenes of the video might be presented.

What is needed are techniques for generating and presenting videos that are constructed differently on the basis of information found in or derived from a particular corpus. None of the aforementioned legacy approaches achieve the capabilities of the herein-disclosed techniques for generating multi-scene video clips based on a conditional logic graph. Therefore, there is a need for improvements.

SUMMARY

The present disclosure provides an improved method, system, and computer program product suited to address the aforementioned issues with legacy approaches. More specifically, the present disclosure provides a detailed description of techniques used in methods, systems, and computer program products for generating multi-scene video clips based on a conditional logic graph. The claimed embodiments address the problem of automatically generating a video story. More specifically, some claims are directed to approaches for selecting a next scene based on conditions determined from earlier scenes, which claims advance the technical fields for addressing the problem of automatically generating a video story, as well as advancing peripheral technical fields. Some claims improve the functioning of multiple systems within the disclosed environments.

Exemplary embodiments commence upon invoking a computer-implemented task to receive a user credential, which credential is used to determine and access one or more initial search corpora. Information in the initial search corpora are analyzed to determine at least one attribute pertaining to the information. The attribute (e.g., codified as a quantified value or a Boolean value) is used to evaluate various scene conditions (e.g., comprising one or another forms of decision criteria). The scene condition is used to determine the content of a particular next scene, wherein the content can comprise new information, which in turn is used to determine (e.g., based on a scene condition) yet another next scene. The process continues iteratively or recursively, or forward or backward, wherein determining a particular scene is based at least in part on a scene condition of another scene.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

The drawings described below are for illustration purposes only. The drawings are not intended to limit the scope of the present disclosure.

FIG. 1B1 depicts a decision graph used for generating multi-scene video clips based on conditional logic, according to some embodiments.

FIG. 1B2 depicts a decision graph used for evaluating conditions used in generating multi-scene video clips, according to some embodiments.

FIG. 2 presents a user interface for editing a template as used in systems for generating multi-scene video clips based on conditional logic, according to some embodiments.

DETAILED DESCRIPTION

Figure 1A:
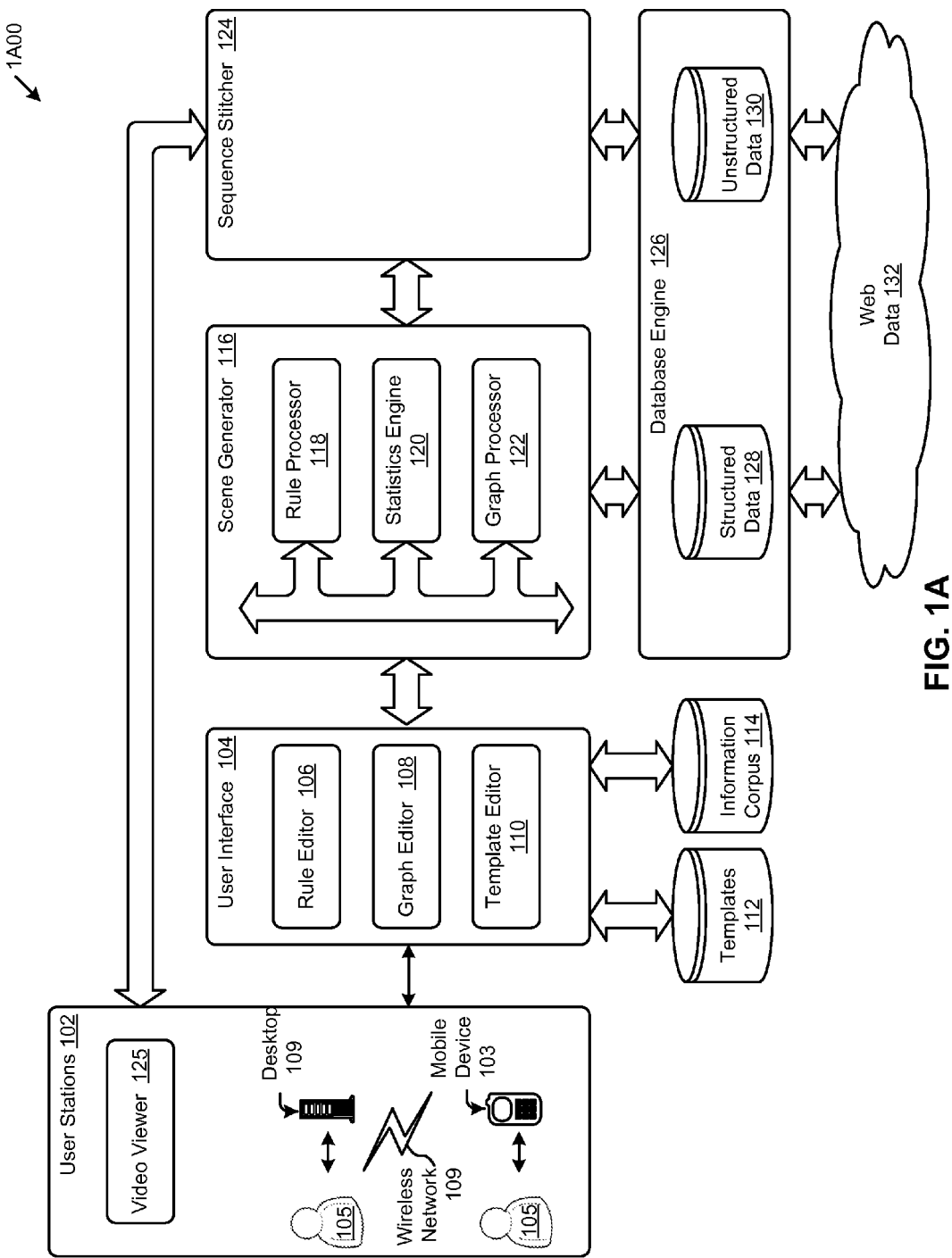
FIG. 1A depicts an environment in which implementations of systems for generating multi-scene video clips based on a conditional logic graph can operate.

Some embodiments of the present disclosure address the problem of automatically generating a video story and some embodiments are directed to approaches for selecting a next scene based on conditions determined from earlier scenes. More particularly, disclosed herein and in the accompanying figures are exemplary environments, methods, and systems for generating multi-scene video clips based on a conditional logic graph.

Overview

Information consumers seek relevance. Often the information consumer can quite precisely articulate what information might be relevant to them, and in some cases an information consumer can describe their meaning of relevance in a set of concrete and unambiguous statements. For example, an information consumer might formulate a directive, "Give me a daily briefing that includes a chart with total sales this month, and if sales to date exceed the quota for the same month, then give me another chart with the breakdown by product." Such a directive might be uttered to a subordinate, or it might be provided to a computer-implemented system that can carry out the directive. Such a computer-implemented system can further process a corpus of information so as to carry out a large number of rules or directives, and in some situations, information to be presented in the video can be pre-processed so as to present the information in a sequence that provides for successive disclosure (e.g., overviews of information followed by detailed analysis).

In some settings, the corpus of information from which user-relevant information is retrieved can be dependent on the user himself (e.g., a social security number), and/or the corpus of information from which user-relevant information is retrieved can be dependent on characteristics of the user (e.g., role in an organization).

This disclosure herein presents the user-relevant information as a stitched-together video to present a meaningful story to the user. Once a set of computer-readable directives has been established (e.g., "Give me a daily briefing that includes a chart with total sales this month"), the corpora are accessed upon user demand, and/or, the corpora are scanned periodically. The processes for collecting information from corpora, then generating video clips based on the collected information and conditional graphs or templates, and then stitching together the video clips requires no further user interaction. In some cases one piece of user-relevant information is used to query for further user-relevant information to retrieve second and Nth bits of user-relevant information. The herein-disclosed system automatically generates the story, based on a given set of subject matter and/or criteria (e.g., key performance indicators). The disclosed system identifies an area corresponding to a given set of subject matter and/or criteria and uses various forms of statistical analysis to determine scope and relevance. Variances from expectation (e.g., problems) that are deemed as related to the given set of subject matter and/or criteria (e.g., too many employees are leaving the company), may invoke further queries to structured or unstructured data, to determine what factors are relevant, possibly including determining a cause or causes of the variance. In some cases there are known solutions to an identified problem, and the disclosed system emits one or more known solutions to advise the user as to a range of potential solutions. Once sufficient user-relevant information has been gathered, the information is formatted into scenes comprising video clips and/or animations, and/or images (e.g., charts). A series of clips, animations and images are stitched together into an animated video sequence, possibly including transitions between scenes. Templates including user-configured templates can be used to present an initial set of constraints or formats for presentation. Templates can also be used as a starting point for editing a set of rules, and/or editing a decision tree or other graph. A template itself can be user-edited, and some embodiments provide a template editor.

Some embodiments of the disclosed system runs continuously, and picks out potential problems (e.g., variance from expectation). Some user configurations emit alerts. A user can configure aspects such as scope, depth of analysis and formats of presentation using one or more user interfaces (UIs). A system for initial configuration, running and viewing is presented in the following figures.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or." That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXEMPLARY EMBODIMENTS

FIG. 1A depicts an environment 1A00 in which implementations of systems for generating multi-scene video clips based on a conditional logic graph can operate. As an option, one or more instances of environment 1A00 or any aspect thereof may be implemented in the context of the architecture and functionality of the embodiments described herein. Also, the environment 1A00 or any aspect thereof may be implemented in any desired environment.

As shown in FIG. 1A, the environment includes one or more users (e.g., user 105) situated at one or more user stations 102. The users access the system to operate and interact with an application system. The user stations comprise any type or types of computing station equipment (e.g., a desktop 109, a mobile device 103, workstations, personal computers, or remote computing terminals, etc.) that may be used to operate or interface with the enterprise applications. The user station comprises a display device, such as a display monitor or mobile device screen, for displaying a user interface to users at the user station. The user station also comprises one or more input devices for the user to provide operational control over the activities of systems within environment 1A00. Such input devices include a mouse or keyboard and can be used to manipulate a pointing object in a graphical user interface and/or to generate user inputs to the enterprise application and/or social networking applications.

Users at user stations interact with a scene generator 116 through a user interface 104, such as through a browser or app. The user interface 104 facilitates user editing of various components used within the environment 1A00. As shown, the user interface 104 is configured to access templates 112, and at least one information corpus 114.

As heretofore described, templates are used for generating multi-scene video clips, and the shown user interface includes a template editor 110. Additionally the user interface 104 can comprise a graph editor 108 and a rule editor 106, which editors are further discussed below.

Video scenes can be generated automatically using a scene generator 116, which in turn comprises a rule processor 118, a statistics engine 120, and a graph processor 122. The scene generator is configured to access structured data 128 and unstructured data 130 using a database engine 126. The database engine is configured to access web data 132 over a network.

The scene generator 116, can generate any number of scenes, which scenes can be stitched together into a sequence using a sequence stitcher 124. Stitched-together videos or individual scenes can be played using a video viewer 125. The scene generator 116, can generate individual scenes based on traversal of a decision graph (see FIG. 1B1). A logic graph can be traversed using a graph processor 122, and decisions found in the decision graph can be made based upon rules, some of which rules may involve determination of statistical quantities. Any number of rules can be retrieved from one or more of the templates 112, and/or via any rules defined in the rule editor 106, and/or rules may be encoded into a decision graph. Any number of rules may be defined in terms of statistical quantities, and such statistical quantities can be calculated using a statistics engine 120.

Strictly an example, a rule might be established to look-up or calculate a quantity used in business management. The rule might carry semantics of the form, "If the corporate employee retention rate is less than 50%, then determine how many employees have left in the reporting period, and determine the average wage for comparing with industry standards." Such a rule might fire when the retention rate or other key performance indicator (KPI) falls below a given threshold.

Firing and execution of such a rule, and retrieval of data from one or more corpora further invoke modules within the scene generator to find a template suited for presenting such data as a video scene. A rule processor 118 can process a series of rules found in a rule database, or a rule processor can fire an initial rule, and that initial rule may cause the firing of a second rule, and so on until no further rules are fired in that iteration. At any moment in time, either synchronously with the firing of rules, and/or asynchronously with the firing of rules, a set of scene conditions can be evaluated. Strictly as one example, a rule may be formatted in the form: If <event> then <action taken>, and/or if <event> then <enter event into a learning model>, and/or if <event> then <action suggested to a scene generator>. In some cases a rule can include multiple forms or formats. For example, a rule can include multiple clauses such as <action taken to enter into learning model> and <action suggested to a scene generator>. In some cases, a rule can be of the form if <condition> else <action>.

When a condition evaluates to a certain value (e.g., a TRUE value, a non-null value, etc.) the occurrence of the condition schedules a corresponding scene to be generated by the scene generator. Any number of potential scenes to be generated and any respective conditions that might cause a scene to be generated can be codified into a decision graph. FIG. 1B1 depicts one embodiment of such a decision graph.

FIG. 1B1 depicts a decision graph 1B100 used for generating multi-scene video clips based on conditional logic. As an option, one or more instances of decision graph 1B100 or any aspect thereof may be implemented in the context of the architecture and functionality of the embodiments described herein. Also, the decision graph 1B100 or any aspect thereof may be implemented in any desired environment.

As shown in FIG. 1B1, the decision graph comprises a root node (see START 140). An evaluation of the START node (e.g., by graph processor 122) can cause the execution of any number of rules (see rule processor 118), and the execution of a rule might have the effect that one or more conditions are detected (e.g., the corporate employee retention was greater than 50% yesterday, but it is less than 50% today). When execution of a rule causes or detects a condition, that condition is compared to conditions pertaining to the evaluated node. In the example instance of decision graph 1B100, the root node has three conditions attached to it. These conditions (e.g., scene condition 144, scene condition 146, and scene condition 148) each form an edge to another node. As shown, scene condition 144 forms an edge to node1, which node1 corresponds to "Scene1," as shown. The scene condition 146 forms an edge to node2, which node2 corresponds to "Scene2," and condition 148 forms an edge to node3, which node3 corresponds to "Scene3." When a condition evaluates to a certain value (e.g., a TRUE value, a non-null value, etc.) the occurrence of the condition schedules the scene of the edge-connected node to be generated by the scene generator. It is possible that multiple condition edges emanate from a given node, and a graph processor can traverse a given decision graph in a depth-first or a breadth-first manner, or in any other order. In some cases, there may be multiple condition edges emanating from a particular node. A condition processor determines the presence or occurrence of a given condition, and an edge processor determines the order in which scenes are to be generated.

A decision graph can be arbitrarily complex, and the codification of aspects of the decision graph can be rich. For example, a node can comprise not only a scene name or indication, but also an audience description, and/or a suggested template to use for the scene. An edge can hold information pertaining to conditions and/or information pertaining to ordering when generating scenes. Further, a condition can be described using an arbitrarily complex condition notation, possibly involving any number or complexity of database queries.

Figure 2:
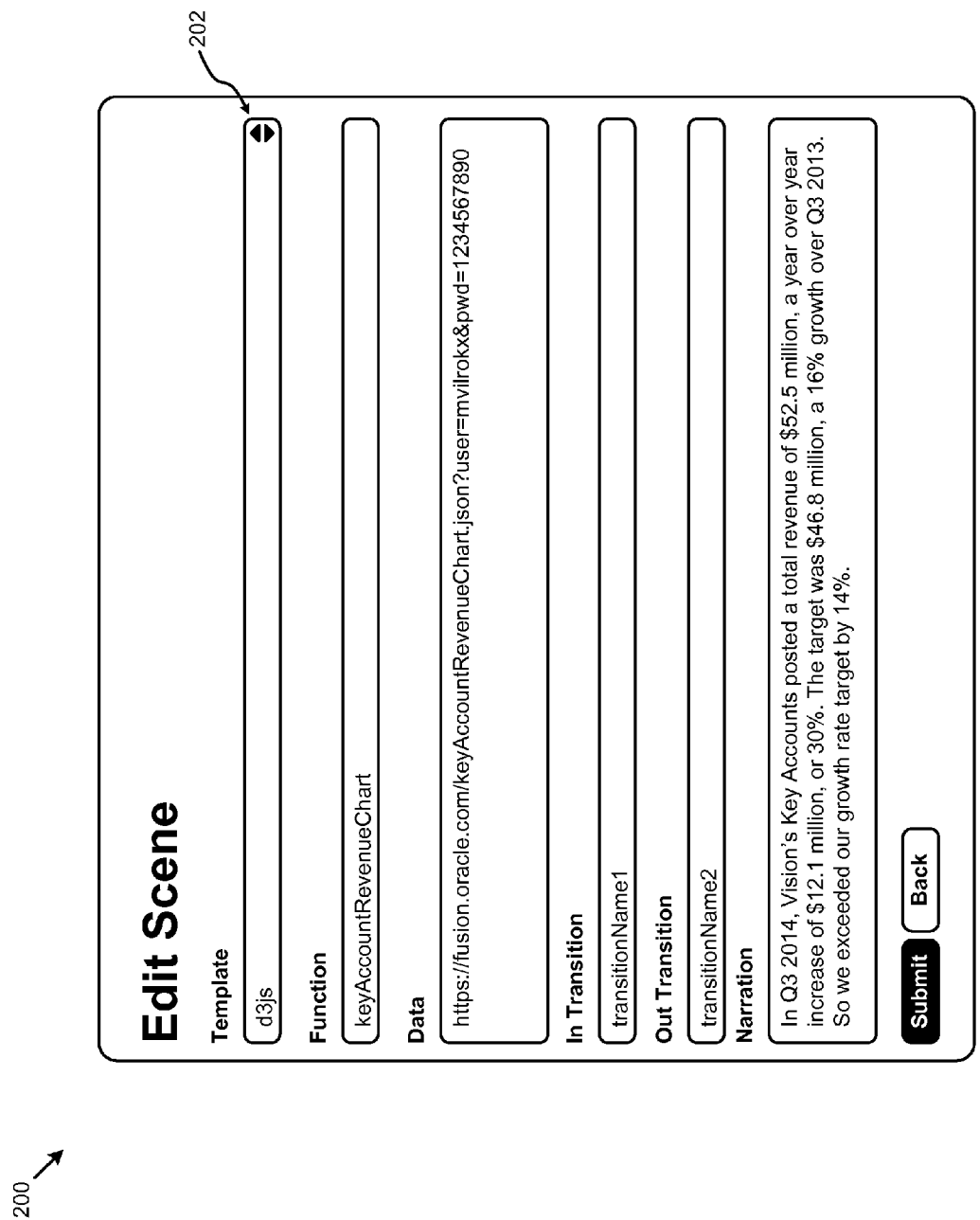

FIG. 1B2 depicts a decision graph used for evaluating conditions used in generating multi-scene video clips. As shown, scene condition 146 does not evaluate to TRUE, and Scene2 is not generated. The evaluation of conditions of the graph (e.g., scene condition 146) is based on a given set of subject matter and/or criteria (e.g., key performance indicators).

Operations corresponding to the node shown as START 140 identifies an area corresponding to a given set of subject matter and/or criteria, and uses various forms of statistical analysis to identify variances from expectation and/or perform other analyses, the results of which are used to evaluate the edge conditions. For example, if the analysis performed in operations corresponding to the node shown as START 140 quantifies that the constitution of the workforce is stable, then scene condition 146 evaluates to FALSE, and Scene2 is not generated. Further if Scene2 is not generated, as shown, then the analyses associated with Scene2 are not performed. For example, if the workforce is deemed to be stable (e.g., scene condition 146 evaluates to FALSE) then additional processing to determine the cause of an unstable workforce is not performed.

Figure 1C:
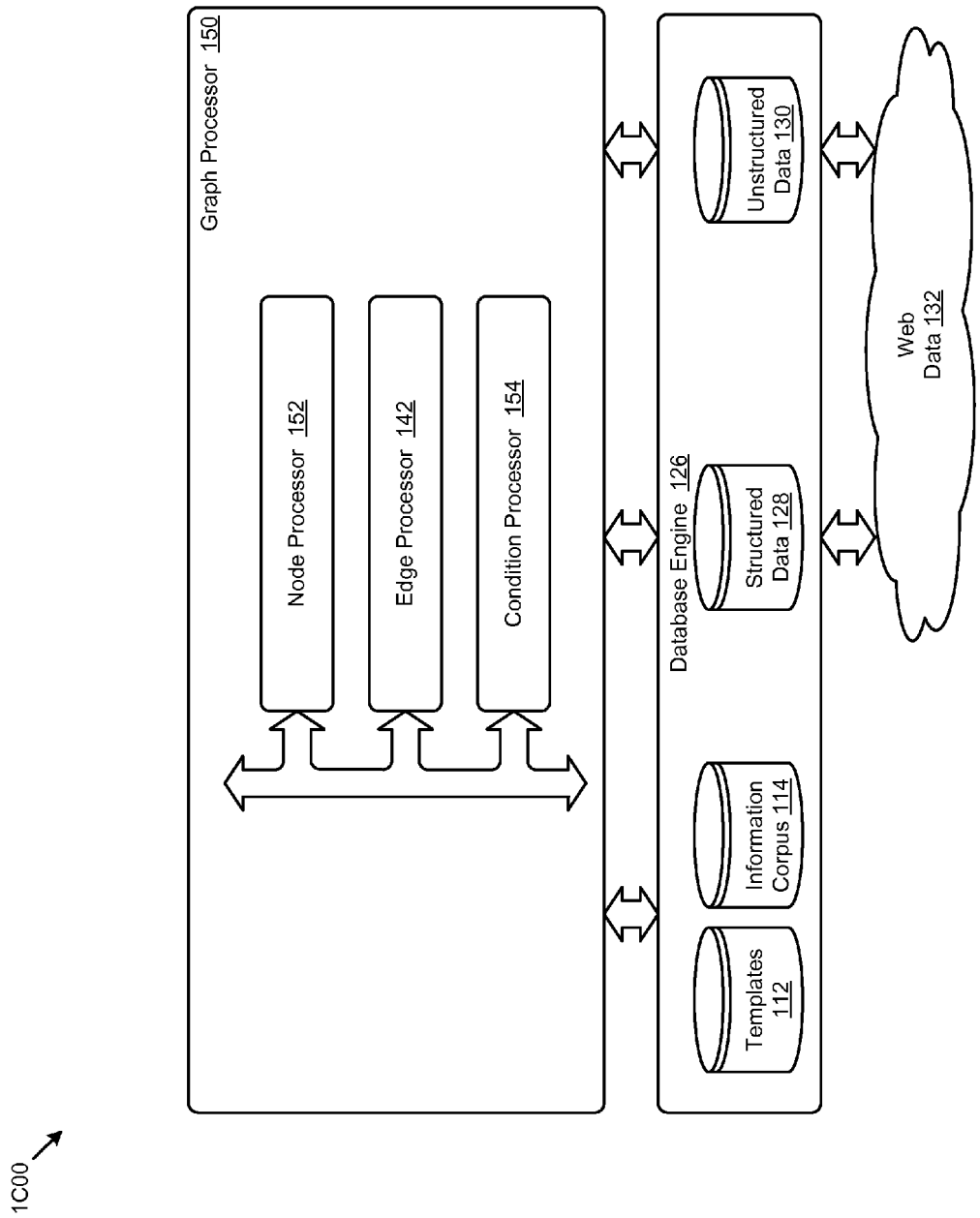
FIG. 1C depicts a graph processor used for processing nodes, edges and conditions when generating multi-scene video clips, according to one embodiment.

FIG. 1C depicts a graph processor used for processing nodes, edges and conditions when generating multi-scene video clips. As an option, one or more instances of graph processor 1C00 or any aspect thereof may be implemented in the context of the architecture and functionality of the embodiments described herein. Also, the graph processor 1C00 or any aspect thereof may be implemented in any desired environment.

As shown within FIG. 1C, the graph processor comprises a node processor 152, and edge processor 142, and a condition processor 154. The aforementioned processors work cooperatively to process a graph so as to generate a series of video scenes, which are later combined into a video presentation.

In exemplary cases, the graph processor is situated in an enterprise application setting, and has access to a database engine, which in turn can access any forms of data from the web. In some cases, access to data within the database engine 126 is restricted based on a user credential (e.g., a login screen name, a username-password pair, etc.). Such a user credential can be used to establish security authorizations or restrictions. In some cases, a credential and/or role (e.g., VP, Director, technical staff, etc.) can be used to determine an initial search corpus. A rule might generally specify information to be retrieved, however the combination of a rule and a user credential and/or role can be used to define an initial search corpus (e.g., portions of structured data 128 and/or unstructured data 130).

In the course of traversing a decision graph, one or more modules serve to retrieve a first parcel of information (e.g., from an initial search corpus). Information from the first parcel of information is used to generate a first scene. More specifically, information from the first parcel of information is used to evaluate rules and conditions, and when a condition is satisfied, the edge-connected node is evaluated and the scene is scheduled to be generated and subsequently stitched together with other scenes.

As shown, the graph processor includes an edge processor 142, which can serve to retrieve additional information, possibly using any portion of the first parcel of information. Specifically, an edge processor can serve to retrieve a second parcel of information based on any aspect of the first parcel if information and/or an evaluation value of at least one of the conditions. The second parcel of information can be used to generate a second scene. A flow between scenes (e.g., via the aforementioned ordering and scheduling techniques) can be formed by the graph processor.

A node and/or any parcel of information may contain enough information to select a template. An appropriate template can be selected based on the condition or conditions present at the time the node is encountered, or an appropriate template can be selected based on information found in a parcel of information. A template can be provided as an initial configuration of a system such as is given in environment 1A00, or a template can be edited (e.g., by a user).

FIG. 2 presents a user interface 200 for editing a scene or template as used in systems for generating multi-scene video clips based on conditional logic. As an option, one or more instances of user interface 200 or any aspect thereof may be implemented in the context of the architecture and functionality of the embodiments described herein. Also, the user interface 200 or any aspect thereof may be implemented in any desired environment.

As shown in FIG. 2, the user interface comprises user interface widgets to give a name to a scene (e.g., a text name or a URL), to identify a template, to describe a function (e.g., a meaningful name of the data to be presented, a location for data to be composited into a scene, and possibly a narration). Scenes can be edited using a UI similar to FIG. 2. This UI (e.g., user interface 200) allows users to pick the template that they want to use as the base for the scene. As described earlier, exemplary systems include predefined templates, however users can modify these predefined templates or create their own templates. Templates will be available in a drop down box 202 for the user to select a suitable template. Depending on the template the user selects, different, additional attributes can be provided. Such attributes will appear in the UI as needed (i.e. when the user picks the template). In some embodiments, a template is recommended and/or automatically selected based on a scene condition. The name of a recommended template can be populated into the drop down box 202.

As shown, the predefined template "d3js" requests that the user also provides a d3js function. This function will be called when the scene based on the d3js template gets rendered. Any given template can provide data to populate the template's attributes fields. In some cases, template data needs to be in a specific format (e.g. the "Title Page" template requires a "title" and a "subtitle" to be present in the data). In some cases template data can be retrieved from and/or made accessible via a Web Service. For example, in the "Edit Scene" UI, the end user provides the end point of this Web Service. When the video is started, the application will retrieve the data from these end points and put them in the templates to generate the actual scenes. Scenes can also have (optional) narration, which will be synthesized as actual spoken words during the displaying of the scene. Additionally, users specify animations and transitions. An "In Transition" specification determines how the scene will begin to appear on the screen (e.g. Fade In, cube, shutters, etc.) and the "Out Transition" specification determines how the scene will disappear from the screen (e.g. Fade Out).

Figure 3:
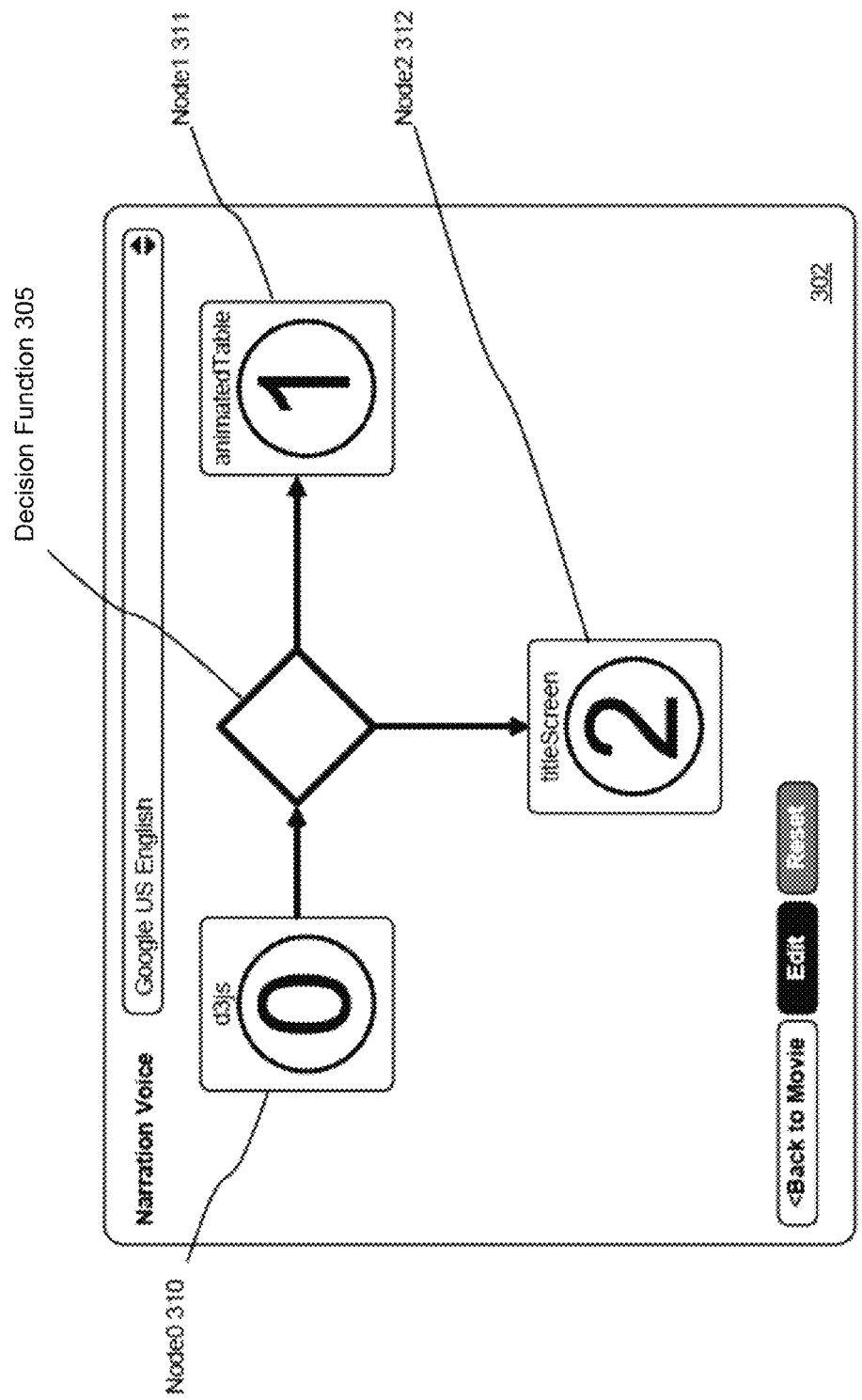
FIG. 3 presents an editing screen used for stitching together video scenes when generating multi-scene video clips based on conditional logic, according to an embodiment.

FIG. 3 presents an editing screen 300 used for stitching together video scenes when generating multi-scene video clips based on conditional logic. As an option, one or more instances of editing screen 300 or any aspect thereof may be implemented in the context of the architecture and functionality of the embodiments described herein. Also, the editing screen 300 or any aspect thereof may be implemented in any desired environment.

As shown in FIG. 3, the editing screen comprises an editing canvas 302. The canvas is initially populated with a scene flow that models all or a portion of a decision graph. In this example, the canvas has a root node, shown as node0 310, a decision function 305, a node1 311 that is entered based on a first evaluation value at decision function 305, and a node2 312 that is entered based on a second evaluation value at decision function 305. The nodes can be annotated for ease of operation by the user. Strictly as an example, the root node is annotated with the flow name, node1 is annotated with the function "animatedTable," and node2 is annotated with the function "titleScreen." As another example, the nodes can be annotated with a template ID or template name or handle.

Figure 4:
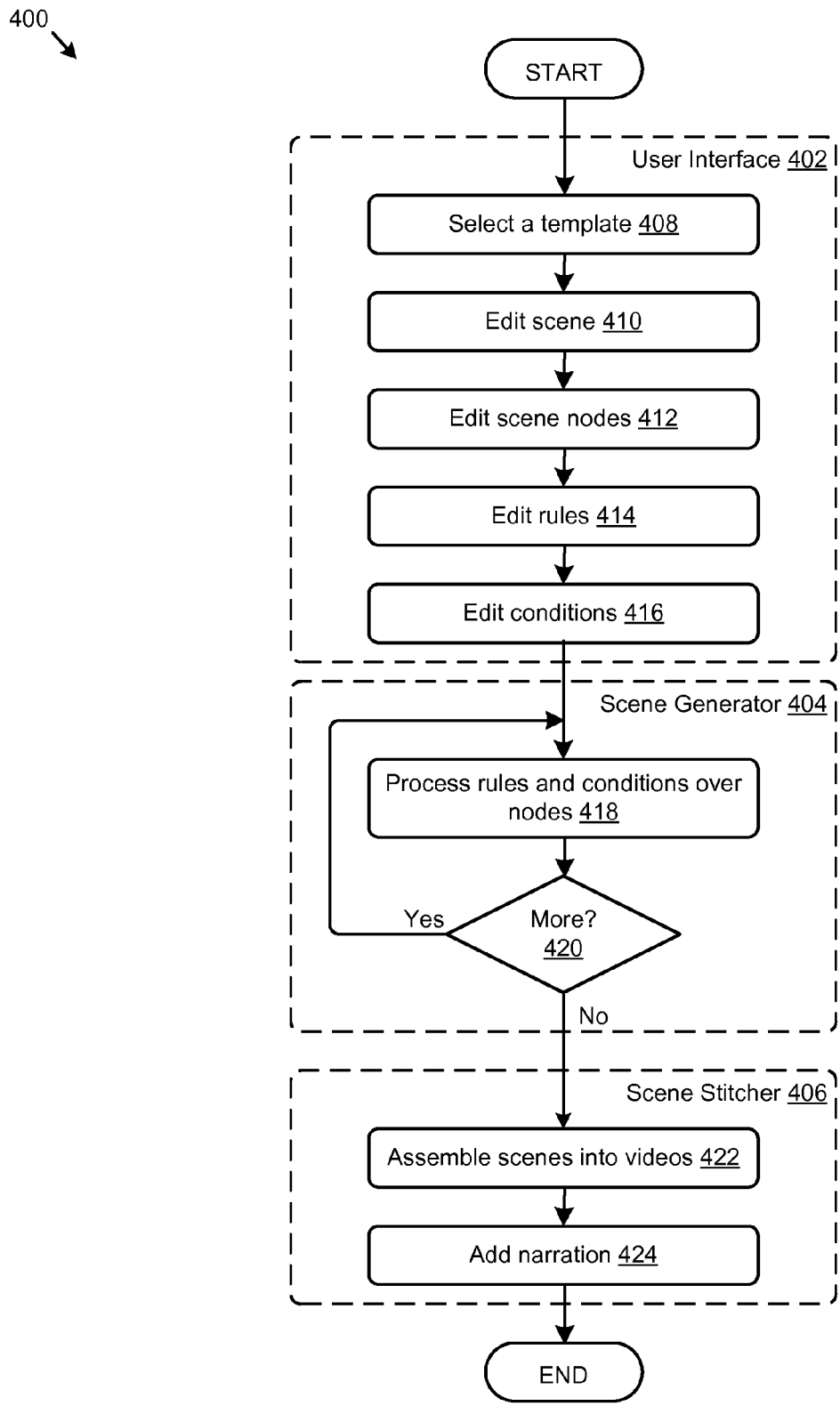
FIG. 4 depicts an example of a use model implemented in systems that generate multi-scene video clips based on a conditional logic graph, according to an embodiment.

FIG. 4 depicts an example of a use model 400 implemented in systems that generate multi-scene video clips based on a conditional logic graph. As an option, one or more instances of use model 400 or any aspect thereof may be implemented in the context of the architecture and functionality of the embodiments described herein. Also, the use model 400 or any aspect thereof may be implemented in any desired environment.

As shown in FIG. 4, the use model comprises an application of a user interface 402, an application of the scene generator 404, and an application of the scene stitcher 406. In this flow, the user invokes the user interface 402 to select a template (see operation 408), edit the scene (see operation 410), possibly including editing scene nodes and/or node attributes (see operation 412). In some embodiments, rules and conditions are pre-populated in a deployed system. In other embodiments or situations a user is given the option of editing rules (see operation 414) and/or editing conditions (see operation 416).

When the editing portion of the shown flow is complete, the scene generator commences, and a decision graph is processed. The processing of the rules and conditions (see operation 418) can proceed through may iterations, so long as there are more nodes, edges, rules, and conditions to be evaluated (see decision 420).

The use model proceeds to the scene stitcher 406, which module assembles the scenes generated by the scene generator into a video. A narration is added. When a narration is provided (e.g., see FIG. 2) for a given scene (e.g., using a particular template), the scene persists in the video at least as long as it takes for the narration to be uttered (e.g., using automatic speech synthesis).

ADDITIONAL EMBODIMENTS OF THE DISCLOSURE

Additional Practical Application Examples

Figure 5:
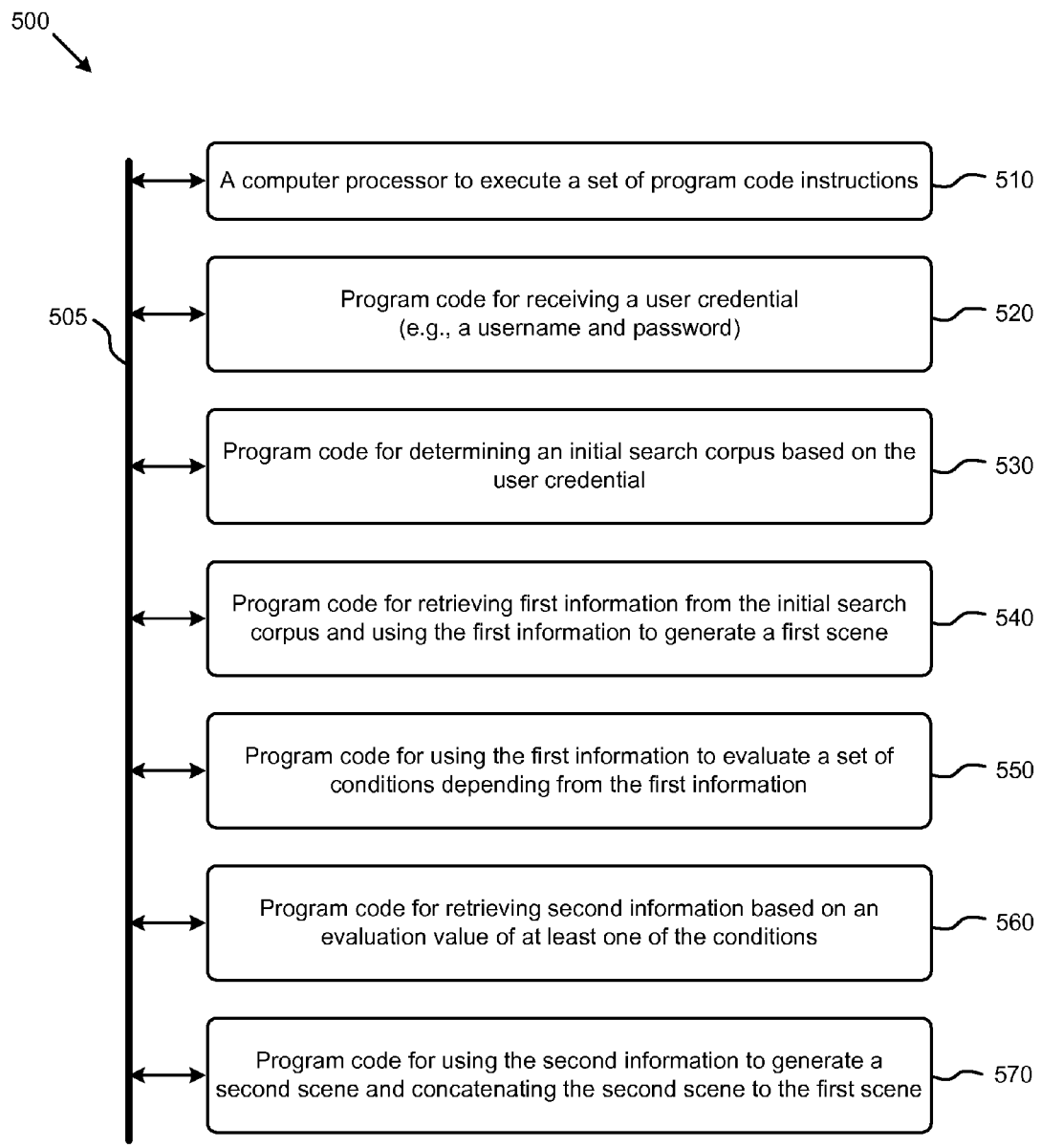
FIG. 5 is a block diagram of a system, according to some embodiments.

FIG. 5 is a block diagram of a system for implementing all or portions of any of the embodiments described herein.

As is shown and described in the foregoing, any of the disclosed techniques can be used, singly or in combination for processing a user credential to determine an initial search corpus based on the user credential, then retrieving first information from the initial search corpus and using the first information to generate a first scene. Using the first information to evaluate a set of conditions depending from the first information, modules operate cooperatively to retrieve second information based on an evaluation value of at least one of the conditions. Given a first scene and a second scene generated based on presence or occurrence of some condition or conditions, then the first scene and second scene can be stitched together to form a video.

One implementation of the foregoing is given as a block diagram of a system to perform certain functions of a computer system. As an option, the present system 500 may be implemented in the context of the architecture and functionality of the embodiments described herein. Of course, however, the system 500 or any operation therein may be carried out in any desired environment. As shown, system 500 comprises at least one processor and at least one memory, the memory serving to store program instructions corresponding to the operations of the system. As shown, an operation can be implemented in whole or in part using program instructions accessible by a module. The modules are connected to a communication path 505, and any operation can communicate with other operations over communication path 505. The modules of the system can, individually or in combination, perform method operations within system 500. Any operations performed within system 500 may be performed in any order unless as may be specified in the claims. The embodiment of FIG. 5 implements a portion of a computer system, shown as system 500, comprising a computer processor to execute a set of program code instructions (see module 510) and modules for accessing memory to hold program code instructions to perform: receiving a user credential (see module 520); determining an initial search corpus based on the user credential (see module 530); retrieving first information from the initial search corpus and using the first information to generate a first scene (see module 540); using the first information to evaluate a set of conditions depending from the first information (see module 550); retrieving second information based on an evaluation value of at least one of the conditions (see module 560); and using the second information to generate a second scene (see module 570).

SYSTEM ARCHITECTURE OVERVIEW

Additional System Architecture Examples

Figure 6:
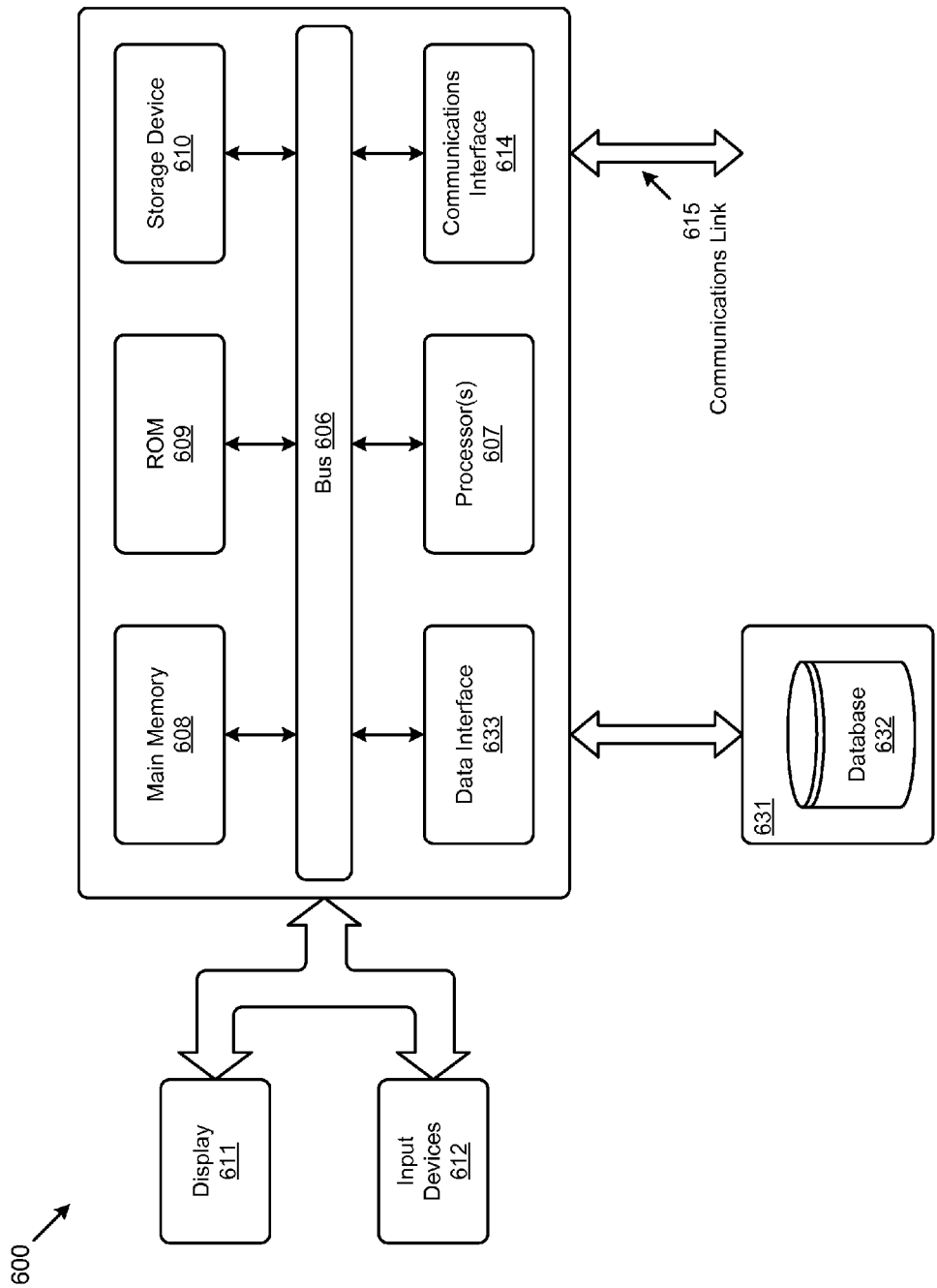
FIG. 6 depicts exemplary architectures of components suitable for implementing embodiments of the present disclosure, and/or for use in the herein-described environments.

FIG. 6 depicts a block diagram of an instance of a computer system 600 suitable for implementing embodiments of the present disclosure. Computer system 600 includes a bus 606 or other communication mechanism for communicating information, which interconnects subsystems and devices such as a processor 607, a system memory (e.g., main memory 608, or an area of random access memory RAM), a static storage device (e.g., ROM 609), a storage device 610 (e.g., magnetic or optical), a data interface 633, a communication interface 614 (e.g., modem or Ethernet card), a display 611 (e.g., CRT or LCD), input devices 612 (e.g., keyboard, cursor control), and an external data repository 631.

According to one embodiment of the disclosure, computer system 600 performs specific operations by processor 607 executing one or more sequences of one or more instructions contained in system memory. Such instructions may be read into system memory from another computer readable/usable medium such as a static storage device or a disk drive. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 607 for execution. Such a medium may take many forms including, but not limited to, non-volatile media and volatile media. Non-volatile media includes, for example, optical or magnetic disks such as disk drives or tape drives. Volatile media includes dynamic memory such as a RAM memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 600. According to certain embodiments of the disclosure, two or more instances of computer system 600 coupled by a communications link 615 (e.g., LAN, PTSN, or wireless network) may perform the sequence of instructions required to practice the disclosure in coordination with one another. Such sequences can be organized to be accessed by one or more processing entities configured to execute a single process or configured to execute multiple concurrent processes to perform work. A processing entity can be hardware-based (e.g., involving one or more cores) or software-based or can be formed of a combination of hardware and software and can carry out computations or processing steps implemented using one or more processes, and/or one or more tasks and/or one or more threads or any combination therefrom.

Computer system 600 may transmit and receive messages, data, and instructions including programs (e.g., application code), through communications link 615 and communication interface 614. Received program code may be executed by processor 607 as it is received and/or stored in storage device 610 or any other non-volatile storage for later execution. Computer system 600 may communicate through a data interface 633 to a database 632 on an external data repository 631. Data items in database 632 can be accessed using a primary key (e.g., a relational database primary key). A module as used herein can be implemented using any mix of any portions of the system memory and any extent of hard-wired circuitry including hard-wired circuitry embodied as a processor 607. Some embodiments include one or more special-purpose hardware components (e.g., power control, logic, sensors, etc.).

Returning to the environment of FIG. 1A, the environment includes components with which various systems can be implemented. Not all of the components shown may be required to practice the embodiments, and variations in the arrangement and type of the components may be made without departing from the spirit or scope of the disclosure.

The environment of FIG. 1A may include local area networks (LANs)/wide area networks (WANs), a wireless network, and client devices. The overall network including any sub-networks and/or wireless networks are in communication with, and enables communication between each of the components the environment.

Instances of client devices may include virtually any computing device capable of communicating over a network to send and receive information, including instant messages, performing various online activities or the like. It should be recognized that more or fewer client devices may be included within a system such as described herein, and embodiments are therefore not constrained by the number or type of client devices employed.

Devices that may operate as client devices may include devices that can connect using a wired or wireless communications medium such as personal computers, servers, multiprocessor systems, microprocessor-based or programmable consumer electronics, network PCs or the like. In some embodiments, client devices may include virtually any portable computing device capable of connecting to another computing device and receiving information such as a laptop computer, a smart phone, a tablet computer, or the like. Portable or mobile computer devices may also include or operate in conjunction with other portable devices such as cellular telephones, display pagers, radio frequency (RF) devices, infrared (IR) devices, personal digital assistants (PDAs), handheld computers, wearable computers integrated devices combining one or more of the preceding devices and the like. As such, client devices can range widely in terms of capabilities and features. Moreover, client devices may provide access to various computing applications including a browser or other web-based applications. A web-enabled client device may include a browser application that is configured to receive and to send web pages, web-based messages and the like. The browser application may be configured to receive and display graphics, text, multimedia and the like, employing virtually any web-based language including a wireless application protocol (WAP) messages and the like. In one embodiment, the browser application is enabled to employ handheld device markup language (HDML), wireless markup language (WML), WMLScript, JavaScript, standard generalized markup language (SGML), HyperText markup language (HTML), eXtensible markup language (XML) and the like, to display and send a message. In one embodiment, a user of the client device may employ the browser application to perform various activities over a network (online). However, another application may also be used to perform various online activities.

Client devices may include at least one client application that is configured to receive and/or send data between another computing device. The client application may include a capability to provide send and/or receive content or the like. The client application may further provide information that identifies itself including a type, capability, name or the like. In one embodiment, a client device may uniquely identify itself through any of a variety of mechanisms including a phone number, mobile identification number (MIN), an electronic serial number (ESN), or other mobile device identifier. The information may also indicate a content format that the mobile device is enabled to employ. Such information may be provided in a network packet or the like, sent between other client devices, or sent between other computing devices.

Client devices may be further configured to include a client application that enables an end-user to log into an end-user account that may be managed by another computing device. Such end-user accounts, in one non-limiting example, may be configured to enable the end-user to manage one or more online activities including, in one non-limiting example, search activities, social networking activities, browse various websites, communicate with other users, participate in gaming, interact with various applications or the like. However, participation in online activities may also be performed without logging into the end-user account.

A wireless communication capability is configured to couple client devices and other components with network. Wireless network may include any of a variety of wireless sub-networks that may further overlay stand-alone and/or ad-hoc networks and the like, to provide an infrastructure-oriented connection for client devices. Such sub-networks may include mesh networks, wireless LAN (WLAN) networks, cellular networks and the like. In one embodiment, the system may include more than one wireless network.

A wireless network may further include an autonomous system of terminals, gateways, routers and the like, connected by wireless radio links and the like. These connectors may be configured to move freely and randomly and organize themselves arbitrarily such that the topology of a wireless network may change rapidly. A wireless network may further employ a plurality of access technologies including AMPS and/or second generation (2G), and/or third generation (3G), and/or fourth generation (4G) generation radio access for cellular systems, WLAN, wireless router (WR) mesh and the like. The foregoing access technologies as well as emerging and/or future access technologies may enable wide area coverage for mobile devices such as client devices with various degrees of mobility. In one non-limiting example, wireless network may enable a radio connection through a radio network access such as a global system for mobile (GSM) communication, general packet radio services (GPRS), enhanced data GSM environment (EDGE), wideband code division multiple access (WCDMA) and the like. A wireless network may include any wireless communication mechanism by which information may travel between client devices and/or between another computing device or network.

Any of the foregoing networks can be configured to couple network devices with other computing devices and communication can include communicating between the Internet. In some situations communication is carried out using combinations of LANs, WANs, as well as direct connections such as through a universal serial bus (USB) port, other forms of computer readable media. On an interconnected set of LANs, including those based on differing architectures and protocols, a router acts as a link between LANs, enabling messages to be sent from one to another. In addition, communication links within LANs may include twisted wire pair or coaxial cable, while communication links between networks may use analog telephone lines, full or fractional dedicated digital lines including T1, T2, T3, and T4, and/or other carrier mechanisms including, for example, E-carriers, integrated services digital networks (ISDNs), digital subscriber lines (DSLs), wireless links including satellite links, or other communications links known to those skilled in the art. Moreover, communication links may further employ any of a variety of digital signaling technologies including, without limit, for example, DS-0, DS-1, DS-2, DS-3, DS-4, OC-3, OC-12, OC-48 or the like. Furthermore, remote computers and other related electronic devices could be remotely connected to either LANs or WANs via a modem and temporary telephone link. In one embodiment, networks may be configured to transport information of an Internet protocol (IP). In some cases, communication media carries computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than in a restrictive sense.

What is claimed is:

1. A system to generate a video comprising a plurality of scenes comprising:
 a database having a set of storage devices to hold a set of data records to form a plurality of search corpora, at least a portion of the search corpora accessible based on a user credential;
 one or more processors corresponding to a plurality of processing entities associated with respective portions of program memory;
 a memory segment being accessible by an address provided by one or more concurrently executing processing entities;
 a processor that executes a sequence of instructions which, when executed by the processor causes the processor to execute a process, the process comprising:
  analyzing information from the portion of the search corpora or from a second search corpus to determine at least one attribute pertaining to the information;
  executing a rule corresponding to a node of a decision graph, each node comprising one or more selected from a group consisting of: a scene name, a scene indication, an audience description, a template description, and any combination thereof;
  detecting a scene condition of a scene based on execution of the rule corresponding to the node of the decision graph;
  generating the scene, the scene comprising information included in the portion of the search corpora;
  evaluating the scene condition of the scene, the scene condition based at least in part on the attribute;
  determining a content of a next scene of the plurality of scenes based at least in part on a value obtained by evaluating the scene condition;
  determining an additional scene should not be generated based on the scene condition of the scene;
  accessing a second portion of the search corpora accessible based on the scene condition of another scene, the second portion of the search corpora comprising the content of the next scene;
  selecting a template for presenting the content of the next scene, the template selected based on information found in the second portion of the search corpora;
  generating the next scene of the plurality of scenes such that the next scene comprises the content;
  editing the next scene based on information specified in a user interface, the user interface comprising information specifying one or more of a name of the next scene and the template for presenting the next scene;
  assembling at least the scene and the next scene into the video; and
  adding narration to the video;
  wherein evaluating the scene condition of the scene comprises comparing the scene condition to a plurality of scene conditions associated with the node of the decision graph;
  wherein the portion of the search corpora is defined based on one or more selected from a group consisting of the user credential, a user role of a user associated with the user credential, a rule, and any combination thereof;
  wherein access to the plurality of search corpora is restricted to the portion of the search corpora based on the user credential;
  wherein the user credential comprises one or more of a login screen name and a username-password pair;

wherein the scene condition evaluates to a quantified value or a Boolean value;
wherein the information from the portion of the search corpora is analyzed periodically;
wherein determining the content of the next scene comprises using statistical analysis to determine a scope and a relevance of the content of the next scene;
wherein determining the content of the next scene of the plurality of scenes comprises traversing the decision graph, the content of the next scene determined based on a set of rules encoded into the decision graph, at least some of the set of rules associated with a determination of one or more statistical quantities;
wherein the decision graph is traversed in a depth-first manner or a breadth-first manner;
wherein the search corpora comprises structured data and unstructured data;
wherein the template comprises a plurality of attribute fields, the attributes comprising one or more selected from a group consisting of: a title, a subtitle, a narration, a transition, and any combination thereof.

2. The system of claim 1, wherein the sequence of instructions further has instructions encoded thereon which, when executed by the processor, causes the processor to execute the process, the process further comprising:
scheduling one or more of the scene and the next scene to be generated.

3. The system of claim 1, wherein the sequence of instructions further has instructions encoded thereon which, when executed by the processor, causes the processor to execute the process, the process further comprising determining a user role of a user based on the user credential.

4. The system of claim 3, wherein the portion of the search corpora is determined based at least in part on the user role.

5. The system of claim 3, wherein the portion of the search corpora is determined based at least in part on a user profile corresponding to the user role.

6. The system of claim 1, wherein the at least one aspect of the information is determined using a key performance indicator.

7. The system of claim 1, further comprising a template editor configured to read from a plurality of templates.

8. The system of claim 7, wherein a particular template is selected based at least in part on a scene condition.

9. The system of claim 1, further comprising a graph processor configured to process nodes, edges and conditions when determining the next scene.

10. A method to generate a video comprising a plurality of scenes comprising:
accessing a set of storage devices to hold a set of data records to form a plurality of search corpora, at least a portion of the search corpora accessible based on a user credential;
analyzing information from the portion of the search corpora or from a second search corpus to determine at least one attribute pertaining to the information;
executing a rule corresponding to a node of a decision graph, each node comprising one or more selected from a group consisting of: a scene name, a scene indication, an audience description, a template description, and any combination thereof;
detecting a scene condition of a scene based on execution of the rule corresponding to the node of the decision graph;
generating the scene, the scene comprising information included in the portion of the search corpora;
evaluating the scene condition of the scene, the scene condition based at least in part on the attribute;
determining a content of a next scene of the plurality of scenes based at least in part on a value obtained by evaluating the scene condition;
determining an additional scene should not be generated based on the scene condition of the scene;
accessing a second portion of the search corpora accessible based on the scene condition of another scene, the second portion of the search corpora comprising the content of the next scene;
selecting a template for presenting the content of the next scene, the template selected based on information found in the second portion of the search corpora;
generating the next scene of the plurality of scenes such that the next scene comprises the content;
editing the next scene based on information specified in a user interface, the user interface comprising information specifying one or more of a name of the next scene and the template for presenting the next scene;
assembling at least the scene and the next scene into the video; and
adding narration to the video;
wherein evaluating the scene condition of the scene comprises comparing the scene condition to a plurality of scene conditions associated with the node of the decision graph;
wherein the portion of the search corpora is defined based on one or more selected from a group consisting of the user credential, a user role of a user associated with the user credential, a rule, and any combination thereof;
wherein access to the plurality of search corpora is restricted to the portion of the search corpora based on the user credential;
wherein the user credential comprises one or more of a login screen name and a username-password pair;
wherein the scene condition evaluates to a quantified value or a Boolean value;
wherein the information from the portion of the search corpora is analyzed periodically;
wherein determining the content of the next scene comprises using statistical analysis to determine a scope and a relevance of the content of the next scene;
wherein determining the content of the next scene of the plurality of scenes comprises traversing the decision graph, the content of the next scene determined based on a set of rules encoded into the decision graph, at least some of the set of rules associated with a determination of one or more statistical quantities;
wherein the decision graph is traversed in a depth-first manner or a breadth-first manner;
wherein the search corpora comprises structured data and unstructured data;
wherein the template comprises a plurality of attribute fields, the attributes comprising one or more selected from a group consisting of: a title, a subtitle, a narration, a transition, and any combination thereof.

11. The method of claim 10, further comprising:
scheduling one or more of the scene and the next scene to be generated.

12. The method of claim 10, further comprising determining a user role of a user based on the user credential.

13. The method of claim 12, wherein the portion of the search corpora is determined based at least in part on the user role.

14. The method of claim 12, wherein the portion of the search corpora is determined based at least in part on a user profile corresponding to the user role.

15. The method of claim 10, wherein the at least one aspect of the information is determined using a key performance indicator.

16. The method of claim 10, further comprising configuring a template editor to read from a plurality of templates.

17. The method of claim 16, wherein a particular template is selected from the plurality of templates based at least in part on a scene condition.

18. A computer program product to generate a video comprising a plurality of scenes, embodied in a non-transitory computer readable medium, the computer readable medium having stored thereon a sequence of instructions which, when executed by a processor causes the processor to execute a process, the process comprising:
   accessing a set of storage devices to hold a set of data records to form a plurality of search corpora, at least a portion of the search corpora accessible based on a user credential;
   analyzing information from the portion of the search corpora or from a second search corpus to determine at least one attribute pertaining to the information;
   executing a rule corresponding to a node of a decision graph, each node comprising one or more selected from a group consisting of: a scene name, a scene indication, an audience description, a template description, and any combination thereof;
   detecting a scene condition of a scene based on execution of the rule corresponding to the node of the decision graph;
   generating the scene, the scene comprising information included in the portion of the search corpora;
   evaluating the scene condition of the scene, the scene condition based at least in part on the attribute;
   determining a content of a next scene of the plurality of scenes based at least in part on a value obtained by evaluating the scene condition;
   determining an additional scene should not be generated based on the scene condition of the scene;
   accessing a second portion of the search corpora accessible based on the scene condition of another scene, the second portion of the search corpora comprising the content of the next scene;
   selecting a template for presenting the content of the next scene, the template selected based on information found in the second portion of the search corpora;
   generating the next scene of the plurality of scenes such that the next scene comprises the content;
   editing the next scene based on information specified in a user interface, the user interface comprising information specifying one or more of a name of the next scene and the template for presenting the next scene;
   assembling at least the scene and the next scene into the video; and
   adding narration to the video;
   wherein evaluating the scene condition of the scene comprises comparing the scene condition to a plurality of scene conditions associated with the node of the decision graph;
   wherein the portion of the search corpora is defined based on one or more selected from a group consisting of the user credential, a user role of a user associated with the user credential, a rule, and any combination thereof;
   wherein access to the plurality of search corpora is restricted to the portion of the search corpora based on the user credential;
   wherein the user credential comprises one or more of a login screen name and a username-password pair;
   wherein the scene condition evaluates to a quantified value or a Boolean value;
   wherein the information from the portion of the search corpora is analyzed periodically;
   wherein determining the content of the next scene comprises using statistical analysis to determine a scope and a relevance of the content of the next scene;
   wherein determining the content of the next scene of the plurality of scenes comprises traversing the decision graph, the content of the next scene determined based on a set of rules encoded into the decision graph, at least some of the set of rules associated with a determination of one or more statistical quantities;
   wherein the decision graph is traversed in a depth-first manner or a breadth-first manner;
   wherein the search corpora comprises structured data and unstructured data;
   wherein the template comprises a plurality of attribute fields, the attributes comprising one or more selected from a group consisting of: a title, a subtitle, a narration, a transition, and any combination thereof.

19. The computer program product of claim 18, wherein sequence of instructions further has instructions encoded thereon which, when executed by the processor, causes the processor to execute the process, the process further comprising:
   scheduling one or more of the scene and the next scene to be generated.

20. The computer program product of claim 18, wherein the process further comprises configuring a template editor to read from a plurality of templates.

* * * * *

UNITED STATES PATENT AND TRADEMARK OFFICE
CERTIFICATE OF CORRECTION

PATENT NO. : 9,847,101 B2  
APPLICATION NO. : 14/577894  
DATED : December 19, 2017  
INVENTOR(S) : Vilrokx et al.

Page 1 of 1

It is certified that error appears in the above-identified patent and that said Letters Patent is hereby corrected as shown below:

On the Title Page

On page 2, Column 1, item [56], Line 2, delete "Oralce," and insert -- Oracle, --, therefor.

Signed and Sealed this  
Tenth Day of July, 2018

Andrei Iancu  
*Director of the United States Patent and Trademark Office*